Nov. 3, 1964

W. H. CLAYTON, JR., ETAL  3,155,077

POWER PLANT ORGANIZATION AND METHOD OF OPERATION

Filed Dec. 28, 1962  3 Sheets-Sheet 1

FIG_1

Nov. 3, 1964  W. H. CLAYTON, JR., ETAL  3,155,077
POWER PLANT ORGANIZATION AND METHOD OF OPERATION
Filed Dec. 28, 1962    3 Sheets-Sheet 3

United States Patent Office 3,155,077
Patented Nov. 3, 1964

3,155,077
POWER PLANT ORGANIZATION AND
METHOD OF OPERATION
William H. Clayton, Jr., Windsor, and Ronald B. Knust,
Hartford, Conn., assignors to Combustion Engineering,
Inc., Windsor, Conn., a corporation of Delaware
Filed Dec. 28, 1962, Ser. No. 247,908
10 Claims. (Cl. 122—479)

This invention relates generally to power plants wherein a vapor generator supplies the motive fluid to a vapor turbine or the like which, in turn, drives an electric generator with the invention being particularly concerned with a forced through-flow supercritical vapor generator-turbine combination and method of operating the same with this combination utilizing the double reheat cycle and with both the primary vapor as well as the high pressure and the low pressure reheat vapors being maintained at their desired and predetermined temperature throughout a substantial load range over which the vapor generator plant operates.

In the operation of a forced through-flow vapor generator-turbine combination wherein the double reheat cycle is employed it is necessary to provide sufficient control operations to insure that the primary and both of the reheat vapors as delivered to the multi-expansion prime mover are maintained at a predetermined value throughout the range of load over which the power plant is operated. In the organization with which the present invention is concerned the characteristic with regard to the two reheats is such that as the load is decreased from its maximum value the percentage of the total heat absorption of the unit required by the high pressure reheater increases considerably with relation to such percentage required by the low pressure reheater in order that the high pressure and the lower pressure reheat temperatures will be maintained at their desired value. Moreover, the relation of the heat absorption of the primary fluid to that of each of the reheats necessary to maintain the desired temperature changes with variation of load. Accordingly, it is necessary to provide a separate control operation or effect for each of the reheats and the primary fluid in order to maintain them at the desired temperature with varying load.

In accordance with the method and organization of the present invention the temperature and pressure of the primary supercritical fluid delivered to the high pressure stage of the prime mover is regulated by controlling the firing rate of the unit and the delivery of feedwater to the through-flow circuit of the unit while the reheats are controlled by a combination of control actions organized with relation to the reheaters so that sufficient independent control of the reheat temperatures is obtained to provide the necessary control action required to maintain these temperatures at their desired value throughout the operating load range. The combination of control actions is preferably achieved primarily by so-called gas tempering and gas recirculation. The high pressure and the low pressure reheaters receive the predominant portion of their heat input by convection and the high pressure reheater is positioned in the combustion gas stream that is generated by burning of fuel in the furnace at an effective location that is upstream of the effective location of the low pressure reheater with there being primary heat exchange surface forming part of the through-flow circuit of the vapor generator interposed in the gas stream between these two locations. With this arrangement the low pressure reheater is effected to a substantially greater extent by gas recirculation than the high pressure reheater while the high pressure reheater, in turn, is effected to a greater extent and possibly even in an opposite sense than the low pressure reheater as a result of the introduction of tempering gases into the furnace. In addition to employing the combination of gas recirculation and gas tempering as the control for the two reheat temperatures, the zone of combustion may be adjusted in the furnace in order to extend the range of control over which both of the reheats may be regulated. There is a practical limit to the control action that can be obtained by gas tempering which is less than that obtainable with gas recirculation and adjustment of the zone of combustion in the furnace may therefore be employed to, in effect, take over after the gas tempering control action has reached its limit and therefore extend the control range over which the unit may be satisfactorily operated.

Accordingly, it is an object of this invention to provide an improved power plant organization wherein a forced through-flow supercritical vapor generator-turbine is operated on the double reheat cycle.

Another object of the invention is to provide an improved method of operating such a power plant system to maintain the vapor supplied to the turbine at its several stages at its desired predetermined temperature.

Still another object of the invention is to provide such a forced through-flow supercritical vapor generator-turbine combination wherein the high pressure and the low pressure reheat temperatures are effectively independently controlled through the combined action of gas recirculation and gas tempering over a predetermined load range.

Still another object of the invention is to provide such a forced through-flow supercritical vapor generator-turbine power plant and method of operating the same wherein the high pressure and the low pressure reheat vapor temperatures are controlled without degrading the cycle by desuperheating or transferring heat from the primary fluid to the reheat fluid or from one reheat fluid to another but rather through a combination of control actions which regulates the heat imparted to the reheaters and effects this regulation independently of the firing rate.

Still another object of this invention is to provide such a forced through-flow supercritical vapor generator-turbine power plant wherein regulation of the high pressure and low pressure reheat vapor temperatures is achieved through the combined control effects of gas recirculation, gas tempering and adjustment of the zone of combustion in the furnace.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein.

Figure 4:
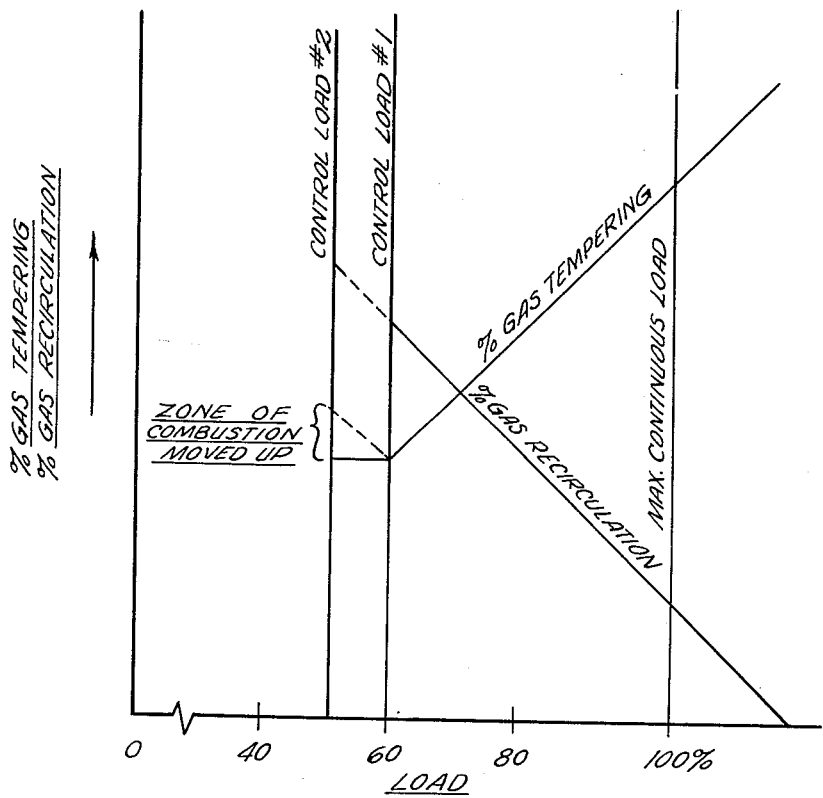
Figure 5:
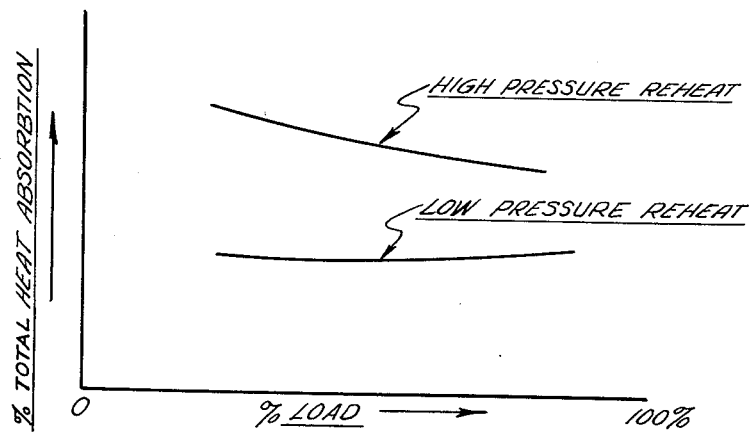

FIGURE 4 is a graphic illustration showing that the percentage of gas recirculation is increased while the percentage of gas tempering is decreased in order to maintain the reheat temperatures at their desired value as the load is decreased from maximum to the control load identified as No. 1. This figure further illustrates that in decreasing the load still further from the control load identified as No. 1 to the control load identified as No. 2 the zone of combustion is moved toward the furnace outlet while the percentage of gas recirculation is further increased; and FIGURE 5 indicates the change in heat absorption of the high pressure and low pressure reheats with variation in load required to maintain the reheat temperatures at their desired value and expressed as a percentage of the total heat absorption.

Referring now to the drawings, wherein like reference characteristics are used throughout to designate like elements, the illustrative and preferred embodiment of the invention depicted therein includes a forced through-flow vapor generator producing primary vapor at supercritical pressure with the generator supplying a multi-stage turbine and with the vapor generator-turbine combination operating on the double reheat cycle. The supercritical forced through-flow vapor generator includes the upright elongated furnace 10 into which fuel and air are introduced in the lower region thereof with the combustion gases produced through the burning of the fuel passing upwardly through the furnace and out the outlet designated generally 12. Extending from this laterally directed outlet is the gas pass 14 which is connected to the upper end of the downwardly directed gas pass 16 with the gases passing downwardly through this latter gas pass and then through the duct 18 which may lead to an air heater or other conventional equipment and finally being discharged to atmosphere through a stack.

The furnace 10 may be fired in any well known manner, such as by means of horizontal cyclones, front wall burner arrangements, tangential firing system or other known arrangements. In the illustrative organization the tangential firing system, such as shown and described in U.S. Patent 2,697,422 issued December 21, 1954, is depicted with this firing system including the burner organizations designated generally 20 and which include the air or wind box 22 and the burner nozzles 24 with these nozzles being adjustable to adjust the zone of combustion vertical in the furnace between the lower zone identified as A and the upper zone identified as B. Air is supplied to the wind box 22 through duct 26 with this air supply being controlled by valve 28 while fuel is supplied to the nozzles 24 through the conduits 30 with this fuel supply being controlled by the valve 32. These burners are disposed symmetrically about the furnace, which is preferably of rectangular transverse section, and introduce fuel and air into the furnace to create a whirling mass rotating about the axis of the furnace.

The through-flow circuit of the supercritical forced through-flow vapor generator includes the economizer 32, the furnace wall tubes 34, the heat exchange section 36 and the final heat exchange section 38 with these various heat exchange elements or portions being connected in series flow relation. The feed pump 40 forces the primary fluid at supercritical pressure through the through-flow circuit with this fluid first traversing the economizer 32 and thence being conveyed through conduit 42 to the mixing vessel 44. From the mixing vessel the primary fluid is conveyed down through conduit 46 to the lower end of the furnace where this conduit is connected with the headers 48 to which the lower ends of the parallelly disposed tubes that line the inner surface of the furnace wall are connected. The primary fluid passes up through these furnace wall tubes 34 and into the header 50 to which the upper ends of the furnace wall tubes are connected. From the header 50 the primary fluid is directed through conduit 52 to the header 54 which is connected with the upper ends of tubes that line the gas pass 16.

This fluid thus flows down through these tubes, through headers 55 and 57 and then through the heat exchange section 36. From the heat exchange section the fluid enters the header 56 and then flows through the conduit 58 to and through the final heat exchange section 38 wherein the fluid which has been vaporized in traversing earlier parts of the through-flow circuit is heated to its desired temperature and is conveyed through conduit 60 to the high pressure stage 62 of the turbine machine 64.

The exhaust from this high pressure stage 62 is conveyed through the high pressure reheater 66 of the vapor generator where it is reheated to a desired temperature with this exhaust being directed to the reheated 66 through exhaust conduit 68. In passing through the reheater the high pressure reheat or high pressure reheat vapor is heated to its desired predetermined value and is returned to and introduced into the intermediate pressure stage 70 of the turbine through the conduit 72. The exhaust from this intermediate stage of the turbine is conveyed to the low pressure reheater 74 through the conduit 76. In traversing this low pressure reheater the low pressure reheat or low pressure reheat vapor is heated to its desired value and is then introduced through conduit 78 to the low pressure stage 80 of the turbine. From this low pressure stage the vapor discharge is conveyed in conventional manner through a condenser, feedwater heater, deaeraters, etc. back to the feed pump 40 where the vaporizable fluid is again forced through the through-flow circuit at supercritical pressure.

In the operation of the vapor generator it is necessary, in order to obtain optimum efficiency, that the temperature of the vapor that is delivered in the various stages of the turbine from the vapor generator be maintained at a predetermined value throughout the operating load range of the power plant. In order to obtain this result it is necessary to provide controls which will provide sufficient independent regulation of the primary vapor, the high pressure reheat vapor and the low pressure reheat vapor so that these vapor temperatures can be regulated with varying load. This independent regulation is necessary with regard to the high pressure and low pressure reheat vapor for the reason that the heat requirements of the high pressure and low pressure reheats as a characteristic of the operation of the power plant system of the invention on the double reheat cycle, vary with respect to each other as well as with respect to the heat requirement of the primary fluid, with variation in load. As the load is decreased on the vapor generator from the maximum load the percentage of heat absorption with relation to the total heat absorption of the unit required by the high pressure reheater increases relative to that of the low pressure reheater, with the system, in accordance with the invention, being such that the percentage of heat absorption of the high pressure heater, with relation to the total, increases substantially while the percentage of heat absorption, with relation to the total of the unit, of the low pressure reheat may remain generally constant or may decrease. This is graphically illustrated in FIGURE 5.

In accordance with the present invention the primary fluid of the forced through-flow supercritical vapor generator is regulated through the combined action of regulating the firing rate of the vapor generator and regulating the flow of fluid through the primary or through-flow circuit of the vapor generator with this latter regulation being provided by means of the valve 82 interposed intermediate the feed pump 40 and the economizer 32.

The control of the high pressure and low pressure reheat vapor temperatures is achieved through the combination of gas tempering and gas recirculation control systems and, if desired, additionally through the adjustment of the zone of combustion in the furnace. The arrangement of the high pressure and low pressure reheat heat exchangers is so arranged that through the combination of a gas tempering and a gas recirculation control system both the high pressure and the low pressure reheat vapor temperatures can be regulated and maintained at their desired value throughout a substantial load range. In the illustrative embodiment the gas tempering and gas recirculation control systems receive their combustion gases from the lower end of duct 16 by means of the recirculating fan 82, with this fan forcing these gases through duct 84 into the gas tempering duct 86 and the gas recirculation duct 88. The gas tempering duct 86 leads to the upper region of the furnace 10 being connected with the distributor 90 which may surround the furnace and have openings leading through the furnace wall into the interior of the furnace. The use of gas tempering in the furnace of vapor generators to control the temperature of the gases that egress from the furnace and thereby control slagging conditions is well known and in common use. It is referred to as tempering gas or a tempering gas system in that its primary purpose is to reduce the temperature of the gases that egress from the furnace. Accordingly, these tempering gases are introduced at a location that is remote from the location of firing the furnace and well toward the furnace outlet being relatively close to the furnace outlet so that the decrease in heat absorption in the furnace resulting from the use of tempering gases is not of great significance. In contrast to this introduction of tempering gases into the furnace the introduction of so-called recirculated gases into the furnace is at a location remote from the furnace outlet so that these gases cause a substantial reduction in heat absorption in the furnace and thus increase the heat content of the gases that egress from the furnace. In the illustrative organization the gas recirculation duct 88 enters the lower region of the furnace, i.e. being connected into the hopper bottom of the furnace. The control thus achieved by gas recirculation is to increase the heat absorption of the convection heat exchange surfaces disposed in the gas pass leading from the furnace with an increase in the quantity of recirculated gases introduced into the furnace up to a practical limit.

The amount of tempering gases introduced into the upper region of the furnace is regulated by the damper 92 in the duct 86 while the amount of recirculated gases introduced into the lower region of the furnace is regulated by the damper 94 in the duct 88.

Figure 2:
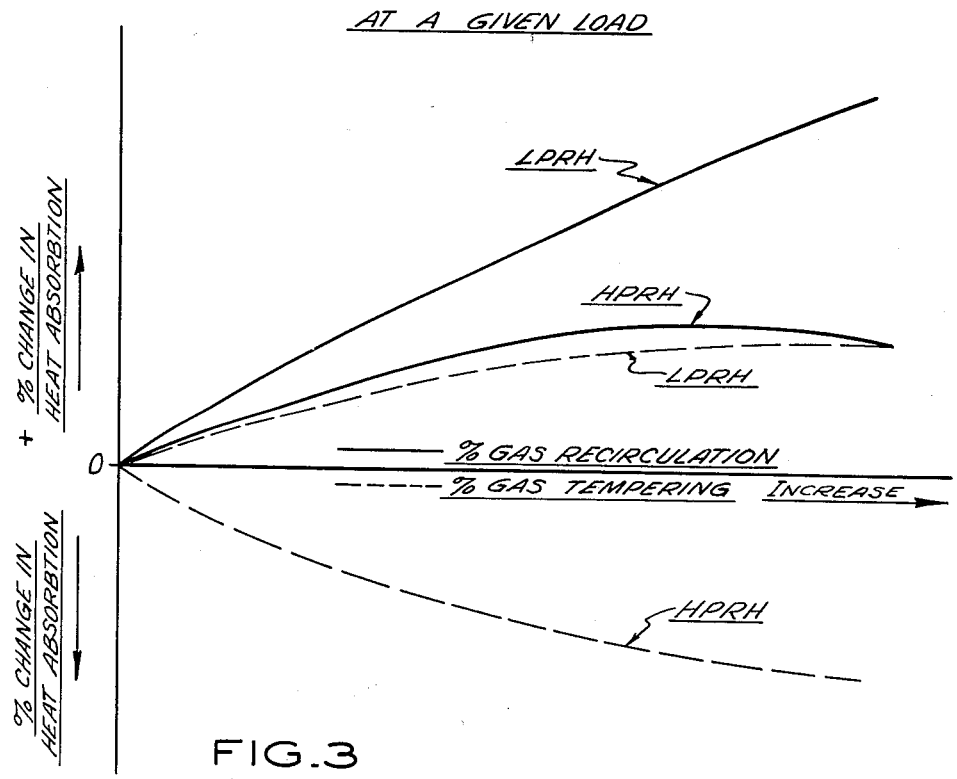
FIGURE 2 is a graphic representation showing the effect, at a particular load (such as full load) of gas recirculation and gas tempering on the heat absorption of the high pressure reheater and the low pressure reheater.

By arranging the high pressure reheater so that it is effectively positioned upstream of the low pressure reheater in the combustion gas stream and by interposing primary heat exchange surface intermediate the effective location of the two reheaters the control effects achieved by gas tempering and gas recirculation are such that a substantial, independent regulation of the high pressure and the low pressure reheat vapor temperatures may be achieved. This can be seen by reference to FIGURE 2 which graphically shows the change in the percentage of heat absorption with relation to total heat absorption of the unit that may be achieved at a predetermined load, such as maximum load, in the high temperature reheater and the low temperature reheater through manipulation of the gas recirculation and gas tempering control systems. As identified in FIGURE 2 the solid line curves represent the change in heat absorption produced by gas recirculation while the dotted line curves represent the change in heat absorption produced by gas tempering control. It will be noted that starting from a 0 point, as the gas recirculation is increased the change in heat absorption effected in the low pressure reheater is substantially greater than that effected in the high pressure reheater with the heat absorption in both, however, generally increasing as the percentage of gas recirculation is increased although at the very end of the curve the high pressure reheat indicates a slight decrease in heat absorption. These curves show that the gas recirculation control is of increasing effectiveness at locations further downstream in the combustion gas stream. In contrast to this control effect obtained with gas recirculation it will be noted that as the percentage of gas tempering is increased there is a very substantial decrease in the heat absorption of the high pressure reheater while there is an increase in the heat absorption of the low pressure reheater although this increase is not of the same magnitude as the decrease obtained in the high pressure reheater. Thus the gas recirculation control has its greatest effect on the low pressure reheat which is well downstream in the gas passes that extend from the outlet of the vapor generator while the gas tempering control has its greatest effect on the high pressure reheat which is close to the outlet of the furnace and with the effect produced on the high pressure reheat by increasing the gas tempering being the opposite of that produced on the high pressure reheat by increasing gas recirculation. As a result of the differences in the control effects on the high pressure and the low pressure reheaters achieved by the gas recirculation and the gas tempering control, the outlet temperatures of the high pressure and low pressure reheaters may be independently controlled through manipulation of the amount of tempering gas introduced into the furnace and the amount of gases recirculated to the lower region of the furnace.

The various heat exchange surfaces of the unit are so designed that at maximum load and with a predetermined amount of tempering gases introduced in the furnace and with very little if any recirculated gases introduced into the lower region of the furnace, the high pressure and the low pressure reheat vapor will be at its desired predetermined value. As the load on the power plant decreases, however, there will be a tendency for the two reheat temperatures to fall from their desired value and vary with relation to each other. Accordingly, as the load on the unit is decreased, the gas tempering system and the gas recirculation system are regulated so as to maintain the high pressure and the low pressure reheat temperatures respectively at their desired value. This is achieved by decreasing the amount of tempering gases introduced into the furnace as the load is decreased and increasing the amount of gases recirculated to the lower region of the furnace. Since the gas tempering control has its greatest effect on the high pressure reheater and gas recirculation its greatest effect on the low pressure reheater, the outlet temperature of high pressure reheat vapor is controlled by regulating the gas tempering system and the outlet temperature of the low pressure reheat vapor by regulating the gas recirculation system. For this purpose there is provided the temperature responsive device 96 in the outlet line 72 of the high pressure reheater with this device through the controller 98 regulating the damper 92 via the manipulating device 100. The introduction of recirculated gases to the lower region of the furnace is controlled in response to the temperature egressing from the low pressure reheater with there being provided temperature responsive device 102 responding to this temperature and through the action of controller 104 and manipulator 106 being effective to adjust the damper 94.

The primary vapor issuing from the heat exchange section 38 and conveyed to the high pressure stage 62 of the turbine has its pressure and temperature regulated through the manipulation of the firing rate of the vapor generator and the regulation of the flow into and through the through-flow circuit. For this purpose there is provided temperature responsive means 108 and pressure responsive means 110 detecting the temperature and pressure, respectively, of this vapor and through the action of controller 112 being operative to regulate the air flow control valve 28 and the fuel flow control valve 32 via actuators 114 and also being operative to regulate the feedwater control valve 82 via actuator 116.

Thus, with the arrangement of the invention as the load is decreased from maximum the temperature of the primary fluid as well as the high pressure and the low pressure reheat vapor is regulated and maintained at its desired value with the regulation of the reheat temperatures being effected without the use of desuperheaters in the reheat circuits or without transferring heat from the primary fluid to either of the reheat vapors or from one reheat vapor to another which would cause a degradation in the efficiency of the cycle.

The load range over which regulation of the two reheat temperatures may be maintained with the combined gas tempering and gas recirculation control is necessarily limited in that there is a practical limit to the amount of tempering gases that may be introduced into the furnace and still have a satisfactory operation of the furnace. Accordingly, the high pressure and the low pressure reheat vapors may be regulated from maximum down to a predetermined load such as 40 to 60 percent. At this lower limit the effect of the gas tempering control runs out or in other words this is the limit of the gas tempering control with no tempering gases being introduced at this lower limit. This is depicted in FIGURE 4 wherein it is indicated that in decreasing from maximum to control load No. 1 the percentage of gas tempering is decreased while the percentage of gas recirculation is increased. It will be understood that this 60 percent value is merely taken as an illustration and that the value at which the gas tempering control runs out will vary although the effect of this control will run out at some load and will run out before the gas recirculation control effect has reached its limit and accordingly the control that is obtained by means of the gas tempering will be the limiting factor with regard to the load range over which the reheat temperatures may be maintained.

Figure 3:
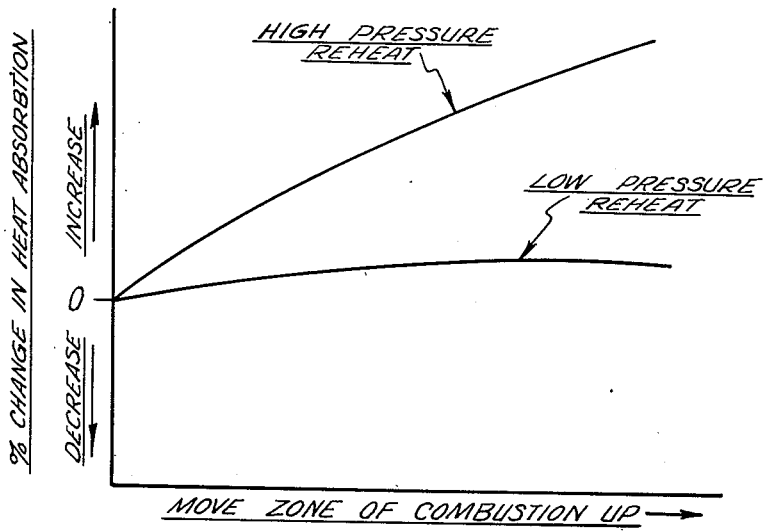
FIGURE 3 is a curve indicating the effect of adjustment of the zone of combustion toward the outlet of the furnace with relation to the heat absorbed by the high pressure and the low pressure reheaters as disposed in accordance with the invention.

In order to extend this load range, such as down to 50 percent load, indicated on FIGURE 4 as control load No. 2, the control effect obtained by adjustment of the zone of combustion in the furnace may be utilized. As previously described, the burner nozzles 24 are vertically adjustable so that the zone of combustion may be varied from the zone identified as A progressively upward to an upper limit of the zone identified as B. This adjustment of the zone of combustion has a more pronounced effect on the heat absorption of the high pressure reheater located close to the furnace outlet than on the lower pressure reheat reheater located more remote from the furnace outlet and well downstream in the gas pass extending from the outlet of the furnace. This is illustrated in FIGURE 3 wherein it is shown that for a particular load adjusting the zone of combustion toward the furnace outlet increases the heat absorption in the high pressure reheater to a substantial extent while increasing the heat absorption in the low pressure reheater to a much smaller extent. Thus, through the combined and simultaneous manipulation of the zone of combustion and the adjustment of the introduction of recirculated gases into the lower region of the furnace, the temperature of the high pressure and low pressure reheat vapors may be maintained at their desired value for the further reduction in load from the 60 to 50 percent value as illustrated in FIGURE 4.

The operation of the burners 20 to adjust the zone of combustion may be automatic and for this purpose the actuating devices 122 may be regulated by the controller 98 which receives its actuating signal from the temperature responsive device 96 responding to the temperature of the vapor leaving the high pressure heater.

In order to achieve the desired independent regulation of the two reheats, i.e. the high pressure and the low pressure reheat vapor, it is necessary that the effective location of the high pressure and the low pressure reheaters in the combustion gas stream be such that the high pressure reheater is spaced well upstream of the low pressure reheater and that there be interposed between the two reheaters primary heat exchange surface. This is so because if the two reheaters are located immediately one after another, the difference in the control effect on each that is obtained by the gas tempering and the recirculation control will, as a practical matter, be insufficient for achieving the regulation of the two reheat temperatures with varying load. It will be appreciated that while the entire high pressure reheater has been illustrated as being upstream of the entire low pressure reheater, this arrangement may be varied as required to obtain the necessary heat input to the high pressure and low pressure reheat fluid. For example, a portion of the low pressure reheater may be placed upstream, immediately downstream, or intermediate two portions of the high pressure reheater. However, it is essential that the high pressure heater receive a preponderance of its heat input at a location in the gas stream which is upstream of the location in the gas stream at which the low pressure reheater receives a preponderance of its heat input and that intermediate these two locations there be provided primary heat exchange surface. With this arrangement an effective control of the two reheat temperatures may be obtained throughout a substantial load range.

In the illustrative forced through-flow supercritical vapor generator there is provided, with relation to the through-flow circuit, a recirculating circuit including the conduit 118 into which is connected the pump 119 and valve 120 with this conduit connecting the conduit 52 to the mixing vessel 44. The purpose of this recirculation system is to provide adequate flow through the high heat absorption tubes of the through-flow circuit that line the furnace wall at low loads and during startup, with this arrangement being shown and described in detail in the co-pending application Serial No. 127,395 filed July 27, 1961, now Patent No. 3,135,252, with the inventor being Willburt W. Schroedter.

Reference to vapor generator and vapor generation as contained herein is intended to include both steam generators as well as vapor generators using vaporizable fluids other than water. It will be appreciated that in accordance with present day technology the most practical form of the invention is with a steam generator.

Figure 1:
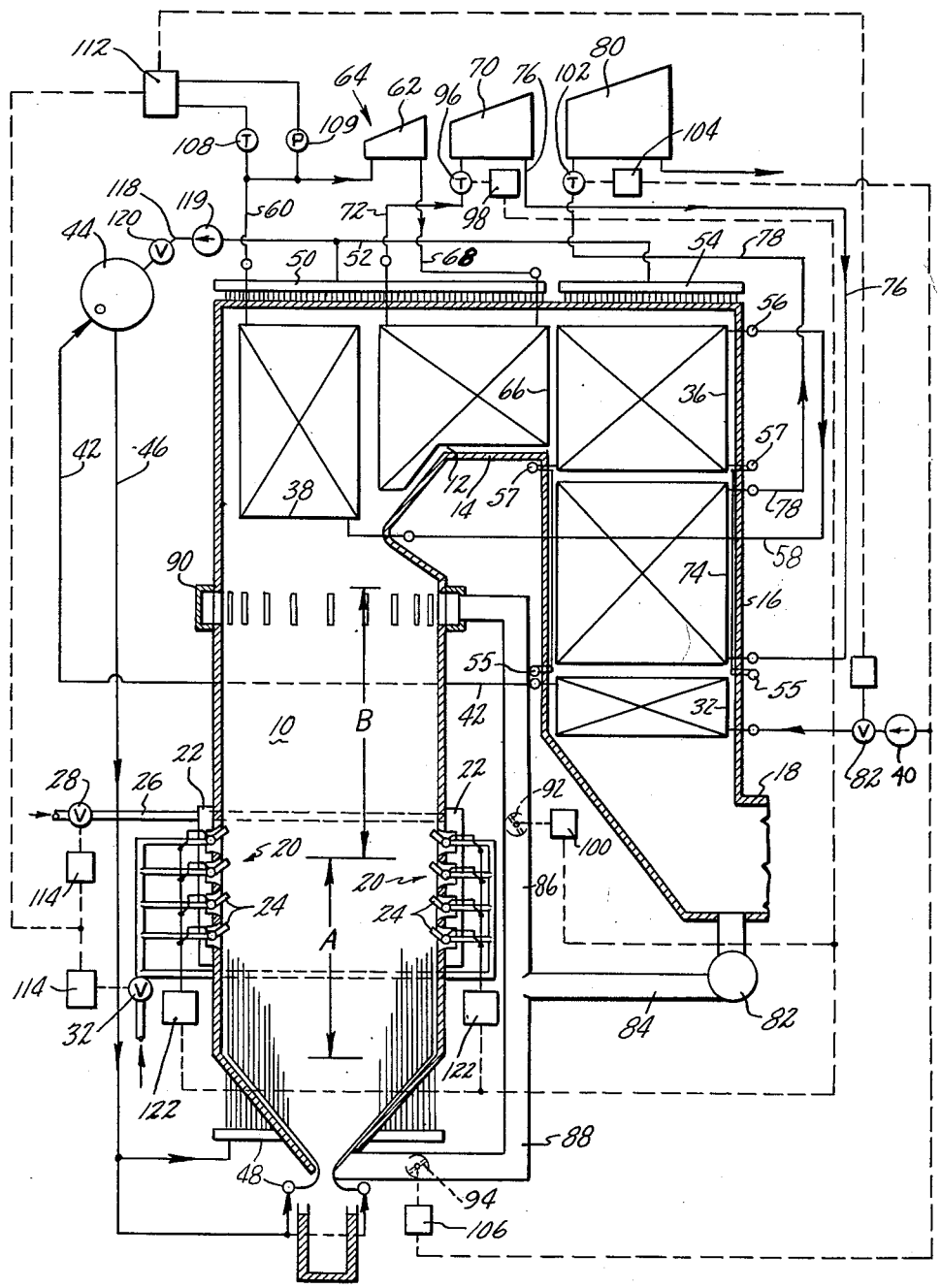
FIGURE 1 is a diagrammatic representation, in the nature of a vertical section, of the power plant organization of the invention.

The various heat exchangers that are positioned in the combustion gas stream that is generated in and passes from the furnace are represented schematically in the diagrammatic illustration of FIGURE 1. It will be appreciated that these heat exchangers, in accordance with conventional practice, are comprised of numerous tubular members that are connected in parallel flow with regard to the vaporizable fluid and which are sinuously or otherwise bent to form a tube bundle or group, with it being the general practice to space these tubes in parallel planes across the width of the gas pass or combustion gas stream.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What we claim is:

1. A forced through-flow supercritical vapor generator-turbine power plant operating on the double reheat cycle and including a fluid cooled furnace, means for introducing and burning fuel therein with the furnace having a combustion gas outlet remote from such means, a gas pass extending from said outlet, high pressure reheater means and low pressure reheater means disposed so that the combustion gases flowing to and through said gas pass flow thereover with the low pressure reheater means being effectively downstream of the high pressure reheater means with respect to the flow of the combustion gases, primary heat exchange surface positioned in the path of the combustion gases between said high pressure and said low pressure reheater means, means operative to introduce combustion gases which have traversed said reheat means into the furnace downstream of the fuel burning means, and means for introducing said combustion gases into the furnace at a location close to the fuel burning means and remote from said outlet, means regulating said first introduction of combustion gases predominantly in response to the high pressure reheat temperature to maintain this temperature constant and means regulating the second mentioned introduction of combustion gases predominantly in response to the low pressure reheat temperature to maintain this temperature constant with varying load.

2. A forced through-flow supercritical vapor generator operating on the double reheat cycle and comprising in combination a fluid cooled furnace having means for introducing and burning fuel therein and having a combustion gas outlet remote from such means, a gas pass extending from said outlet, means for adjusting the zone of combustion toward and away from said furnace outlet, a high pressure reheat means disposed in the combustion gas stream flowing to and through said gas pass so as to effectively receive a preponderance of its heat input at a first location, a low pressure reheat means disposed in said combustion gas stream so as to effectively receive a preponderance of its heat input at a second location downstream of said first location with respect to said gas stream, primary heat exchange surface intermediate these locations, means for introducing combustion gases after traversing said reheat means into the furnace at a location remote from said furnace outlet and means for introducing such combustion gases into the furnace at a location intermediate the firing means and the furnace outlet so that the introduction of these gases in each of these locations has an opposite effect on the heat absorption of said high pressure reheat means, means predominantly responsive to the high pressure reheat temperature to regulate the introduction of combustion gases at the second mentioned location and to regulate the adjustment of the zone of combustion in the furnace so as to maintain this temperature at its desired value with varying load and means responsive to the low pressure reheat temperature operative to regulate the introduction of combustion gases at the first mentioned location to maintain the low pressure reheat temperature at its desired value with varying load.

3. In a vapor generator plant operating on the reheat cycle the combination of a supercritical forced through-flow vapor generator having an upright furnace fired adjacent its lower region and having a combustion gas outlet at its upper region, a gas pass extending from the furnace outlet, a through-flow circuit through which primary fluid is forced including tubes on the furnace walls and heat exchange surface disposed in said gas pass, a high pressure reheater heated predominantly by convection and disposed in the combustion gas stream at a location such that it receives a predominant portion of its heat at a location upstream in the gas pass of said heat exchange surface, a low pressure reheater heated predominantly by convection and disposed in the combustion gas stream so that it receives a predominant portion of its heat at a location downstream in the gas pass of said heat exchange surface, means for conveying combustion gases from said gas pass at a location downstream of the reheaters to a portion of the furnace at the upper region thereof and also to a portion of the furnace in the lower region thereof remote from the combustion gas outlet, means for regulating the firing of the furnace and the flow through the through-flow circuit to maintain the pressure and temperature of the primary fluid at its desired value and means for simultaneously and independently regulating the introduction of combustion gas at said two portions of the furnace to maintain each of the reheat temperatures at its desired value.

4. The organization of claim 3 including means operative to adjust the zone of combustion toward and away from the furnace outlet and means for regulating such adjustment in conjunction with the introduction of combustion gases in the upper region of the furnace simultaneously with, and independently from, the regulation of the introduction of combustion gases in the lower region of the furnace to maintain each of said reheat temperatures at their desired value with varying load.

5. A supercritical forced through-flow vapor generator comprising in combination an elongated furnace having a combustion gas outlet adjacent one end and fired at a location remote therefrom, a gas pass extending from said outlet, a through-flow circuit through which the primary fluid is forced being delivered therefrom to a point of use at a predetermined pressure and temperature, said circuit including tubes disposed on the furnace walls, a high pressure reheater means disposed in the path of the combustion gases flowing to and through said gas pass and low pressure reheater means disposed in said combustion gas path, means for introducing tempering gas into the furnace at a location remote from the location of firing the furnace and means for introducing recirculated gases into the furnace at a location remote from the furnace outlet, the high and low pressure reheat means being operatively associated with said means for introduction of tempering and recirculated gases so that the introduction of tempering gases into the furnace decreases the heat absorption of the high pressure reheater means while the introduction of recirculated gases into the furnace increases the heat absorption of the high pressure reheater means and while the heat absorption of the low pressure reheater is increased both by the introduction of tempering gases into the furnace and the introduction of recirculated gases into the furnace, means for regulating the temperature and pressure of the primary fluid including means for adjusting the firing rate and means for adjusting the flow through said through-flow circuit, means regulating the temperature of the high pressure reheater including means responsive predominantly to the temperature of the high pressure reheat vapor operative to control the introduction of tempering gases into the furnace and means for regulating the low pressure reheat vapor temperature including means responsive predominantly to the temperature thereof operative to regulate the introduction of recirculated gases into the furnace.

6. In a forced through-flow supercritical vapor generator operated on the double reheat cycle and having the walls of the furnace lined with tubes that form part of the through-flow circuit of the vapor generator with the furnace having an outlet adjacent one end and being fired at a location remote therefrom, the improved method of operation comprising regulating the pressure and temperature of the primary vapor by regulating the firing rate and the flow through the primary circuit, reheating said primary vapor a first time by passing it in heat exchange relation with the combustion gas stream produced by the burning of fuel in the furnace and reheating this vapor a second time by passing it in heat exchange relation with said gas stream at an effective location downstream of that for said first reheat, imparting heat to the primary fluid from the gas stream at a location intermediate said reheat locations, introducing into the furnace combustion gases which have traversed said reheat locations at a first location where it is effective to decrease the heat absorption in said first reheat and increase the heat absorption in the second reheat and at a second location where it is effective to increase the heat absorption of both reheats increasing that of the first reheat to a lesser extent than that of the second reheat, introducing a substantial quantity of these gases at said first location at maximum load and decreasing this introduction of gas while increasing the introduction of gas at the second location as the load is decreased.

7. In a forced through-flow supercritical vapor generator operating on the reheat cycle and having an elongated furnace lined with heat exchange tubes at least some of which are connected into the through-flow circuit wherein the primary fluid is heated to its desired temperature and at a desired pressure, the furnace having a combustion gas outlet at one end and being fired at a location remote therefrom, the high pressure and the low pressure reheat means of the generator being heated predominantly by convection and disposed in the combustion gas stream, the improved method characterized by effecting the predominant portion of the high pressure reheating of the vapor by passing it in heat exchange relation with the combustion gas stream at a location close to the furnace outlet while effecting the predominant portion of the low pressure reheating by passing the low pressure vpaor in heat exchange relation with the combustion gas stream at a location downstream of that of the high pressure reheat, passing the primary fluid in heat exchange relation with said gas stream intermediate these locations, regulating the temperature of the low pressure reheat vapor by introducing cooled combustion gases into the furnace at a location remote from the furnace outlet and regulating such introduction to maintain said temperature at its desired value throughout a predetermined load range, regulating the high pressure reheat temperature by introducing cooled combustion gases into the furnace at a location intermediate the zone of firing and the furnace outlet, regulating this latter introduction of combustion gases to maintain the high pressure reheat temperature at a predetermined value throughout a given load range less than said predetermined load range and regulating said high pressure reheat temperature throughout the remainder of said predetermined load range by adjusting the zone of combustion in the furnace with relation to the furnace outlet.

8. In a supercritical vapor generator operating on the double reheat cycle and including an elongated furnace having heat exchange tubes on its walls some of which are connected into the through-flow circuit of the generator, said furnace having a combustion gas outlet adjacent one end, means firing the furnace at a location remote from said outlet, a gas pass extending from said outlet, high pressure and low pressure reheat means disposed in the combustion gas stream produced by the burning of fuel in the furnace, the high pressure reheat means being effectively upstream of the low pressure reheat means with regard to combustion gas flow and with primary heat exchange surface disposed therebetween, the method of control characterized by adjusting the firing of the furnace and the flow of primary fluid, to control parameters of the primary fluid including temperature, regulating the temperature of the low pressure reheat vapor by regulatingly introducing combustion gases from the gas pass at a location downstream of the reheat means into the furnace at a location remote from the furnace outlet and regulating the high pressure reheat temperature by the combination of regulatingly introducing such combustion gas into the furnace at a location remote from the firing zone and intermediate this zone and the furnace outlet and by adjusting the zone of combustion with relation to the furnace outlet.

9. In a forced through-flow supercritical vapor generator operating on the reheat cycle and including a fluid cooled furnace having a combustion gas outlet adjacent one end, means firing a furnace at a location remote from said outlet, means introducing recirculated combustion gases into the furnace at a first location remote from the furnace outlet and at a second location remote from the firing zone and close to said furnace outlet, a high pressure reheater disposed in the combustion gas stream at a location where its heat absorption decreases as a result of introducing recirculated gases into the furnace at said second location, a low pressure reheater in the combustion gas stream at a location where its heat absorption is increased to a substantially greater extent than that of the high pressure reheater incident to the introduction into the furnace of combustion gases at said first location, the improved method of regulating the high pressure and low pressure reheat vapor temperatures over a predetermined load range comprising sensing the low pressure reheat vapor temperature and in accordance therewith regulating the introduction of combustion gases at said first location, sensing the high pressure reheat vapor temperature and in accordance therewith and throughout a portion of the load range regulating the introduction of combustion gases into the furnace at said second location to maintain this temperature at its desired value and through the remaining portion of said load range adjusting the zone of combustion in the furnace with relation to the furnace outlet to maintain said high pressure reheat temperature at its desired value.

10. A forced through-flow supercritical vapor generator operating on the reheat cycle and including an upright elongated furnace having a combustion gas outlet at its upper end and a gas pass extending therefrom, means firing the furnace at a location remote from said upper end, a through-flow circuit including tubular members lining the furnace walls and heat exchange means disposed in said gas pass, a predominantly convection heated high pressure reheat effectively disposed in the stream of combustion gases at a location upstream of said heat exchange means, a predominantly convection heated low pressure reheat effectively disposed in the combustion gas stream downstream of said heat exchange means, means introducing combustion gases from said gas pass at a location downstream of the reheaters into the furnace at a first location in the lower region thereof and at a second location in the upper region thereof, means operative to adjust the zone of combustion toward and away from the furnace outlet, means over-ridingly responsive to the temperature of the low pressure reheat vapor regulating the introduction of combustion gases at said first location, and means over-ridingly responsive to the temperature of the high pressure reheat vapor regulating the introduction of combustion gases at said second location and adjusting the zone of combustion with relation to the furnace outlet.

References Cited in the file of this patent

UNITED STATES PATENTS

| 2,840,054 | Rowand | June 24, 1958 |
| 2,844,004 | Vogler | July 22, 1958 |
| 2,865,344 | Firl | Dec. 23, 1958 |
| 2,947,289 | Miller | Aug. 2, 1960 |
| 2,973,750 | Armacost | Mar. 7, 1961 |
| 2,984,984 | Dickey | May 23, 1961 |

FOREIGN PATENTS

| 793,048 | Great Britain | Apr. 9, 1958 |
| 881,025 | Great Britain | Nov. 1, 1961 |